United States Patent
Chang et al.

(10) Patent No.: US 7,210,125 B2
(45) Date of Patent: Apr. 24, 2007

(54) METHOD AND SYSTEM FOR APPLICATION INSTALLATION AND MANAGEMENT USING AN APPLICATION-BASED NAMING SYSTEM INCLUDING ALIASES

(75) Inventors: David Yu Chang, Austin, TX (US); William Mitchell Edwards, Pflugerville, TX (US); Ajay Arvind Apte, Austin, TX (US); Leigh Allen Williamson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 650 days.

(21) Appl. No.: 10/621,885

(22) Filed: Jul. 17, 2003

(65) Prior Publication Data

US 2005/0015761 A1    Jan. 20, 2005

(51) Int. Cl.
 *G06F 9/45* (2006.01)
(52) U.S. Cl. .................... 717/120; 717/174; 707/103 R
(58) Field of Classification Search ................ 717/174, 717/120; 707/103 R
See application file for complete search history.

(56) References Cited

U.S. PATENT DOCUMENTS

| | | | |
|---|---|---|---|
| 5,787,431 A | 7/1998 | Shaughnessy | 707/100 |
| 5,842,214 A | 11/1998 | Whitney et al. | 707/10 |
| 5,881,378 A * | 3/1999 | Hayashi et al. | 707/100 |
| 5,964,816 A | 10/1999 | Kincaid | 701/45 |
| 5,974,470 A * | 10/1999 | Hammond | 719/331 |
| 6,098,111 A | 8/2000 | Maegawa et al. | 709/300 |
| 6,256,031 B1 | 7/2001 | Meijer et al. | 345/357 |
| 6,262,987 B1 * | 7/2001 | Mogul | 370/400 |
| 6,286,013 B1 | 9/2001 | Reynolds et al. | 707/200 |
| 6,381,627 B1 | 4/2002 | Kwan et al. | 709/201 |
| 6,418,447 B1 * | 7/2002 | Frey et al. | 707/103 R |
| 6,442,685 B1 | 8/2002 | French et al. | 713/100 |
| 6,480,508 B1 | 11/2002 | Mwikalo et al. | 370/475 |
| 6,510,425 B1 * | 1/2003 | Okamoto et al. | 707/3 |
| 6,745,250 B1 * | 6/2004 | Cocks et al. | 719/316 |
| 6,947,925 B2 * | 9/2005 | Newcombe et al. | 707/3 |
| 2002/0065903 A1 | 5/2002 | Fellman | 709/220 |
| 2002/0069399 A1 * | 6/2002 | Miloushey et al. | 717/108 |
| 2002/0116532 A1 | 8/2002 | Berg | 709/246 |
| 2002/0178254 A1 | 11/2002 | Brittenham et al. | 709/224 |
| 2003/0101435 A1 * | 5/2003 | Takahashi et al. | 717/120 |
| 2005/0015401 A1 * | 1/2005 | Chang et al. | 707/103 R |
| 2005/0210033 A1 * | 9/2005 | Newcombe et al. | 707/10 |
| 2005/0235273 A1 * | 10/2005 | Travison et al. | 717/136 |

FOREIGN PATENT DOCUMENTS

JP    410069487 A  *  3/1996

* cited by examiner

*Primary Examiner*—John Chavis
(74) *Attorney, Agent, or Firm*—Hamilton & Terrile, LLP

(57) ABSTRACT

A method is presented for managing applications using application-based names. A naming service registers an alias name; the alias name represents a first compound name that includes an application name that is associated with an application and a deployment name that is associated with a deployment attribute that characterizes a deployment of an instance of the application. The naming service is also able to generate an application-based name associated with an application; the application-based name represents a context within a naming system, and the application-based name is a second compound name that includes the alias name. Applications are managed within a data processing system using application-based names. The first compound name can be associated with a first topology-based name that represents a first context for organizing files that are related to the instance of the application.

21 Claims, 8 Drawing Sheets

METHOD AND SYSTEM FOR APPLICATION INSTALLATION AND MANAGEMENT USING AN APPLICATION-BASED NAMING SYSTEM INCLUDING ALIASES

CROSS-REFERENCE TO RELATED APPLICATIONS

The present application is related to the following application with a common assignee, which is hereby incorporated by reference:

U.S. patent application Ser. No. 10/621,902, filed (TBD), titled "Method and system for implementing an application-based naming system".

BACKGROUND OF THE INVENTION

1. Field of the Invention

The present invention relates to an improved data processing system and, in particular, to a method and an apparatus for management of resources in a data processing system. Still more particularly, the present invention provides a method and an apparatus for implementing a naming system within a data processing system, particularly for supporting software execution, software management, software installation, and/or software deployment.

2. Description of Related Art

During execution, software programs require access to many different kinds of resources, such as an object, a document, a web page, a file, access to executable code in many different forms that are external to the executing software program, or some other type of computational or communicational function or data. In some instances, these resources are directly available to a software module through its supporting operating system. In other cases, an appropriate resource must be identified within a distributed data processing system.

In order to properly identify resources that have been distributed throughout a data processing system, various types of naming systems have been promulgated. While these naming systems address the need for a common methodology of identifying distributed resources, various problems arise with their methodologies, particularly with respect to the installation of applications within a distributed data processing system.

As a first example, a particular prior art naming system implements a single, shared, flat, namespace for all applications across a set of servers, but this naming system prevents the installation of the same application on multiple servers without changing a simple identifier for the application. For example, an application is often known by a simple identifier or name, and multiple instances of the application cannot be installed on multiple servers in this prior art naming system without providing different names for the different instances.

As a second example, a particular prior art naming system allows each server to have its own namespace region, and multiple instances of the same application can be installed across multiple servers. In this case, a given resource is addressed by specifying a fully qualified pathname to a server. However, the use of the topology of a distributed data processing system as part of a naming system causes certain usability problems. For example, when an application needs to be moved from one server to another server, then any references to the application, i.e., any instances of the use of the pathname for the application within the distributed data processing system, need to be updated to reflect the application's new server location.

Therefore, it would be advantageous to provide a method that allows application files to be identified without relying on a topology-based naming system.

SUMMARY OF THE INVENTION

A method is presented for managing applications using application-based names. A naming service registers an alias name; the alias name represents a first compound name that includes an application name that is associated with an application and a deployment name that is associated with a deployment attribute that characterizes a deployment of an instance of the application. The naming service is also able to generate an application-based name associated with an application; the application-based name represents a context within a naming system, and the application-based name is a second compound name that includes the alias name. Applications are managed within a data processing system using application-based names. The first compound name can be associated with a first topology-based name that represents a first context for organizing files that are related to the instance of the application.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
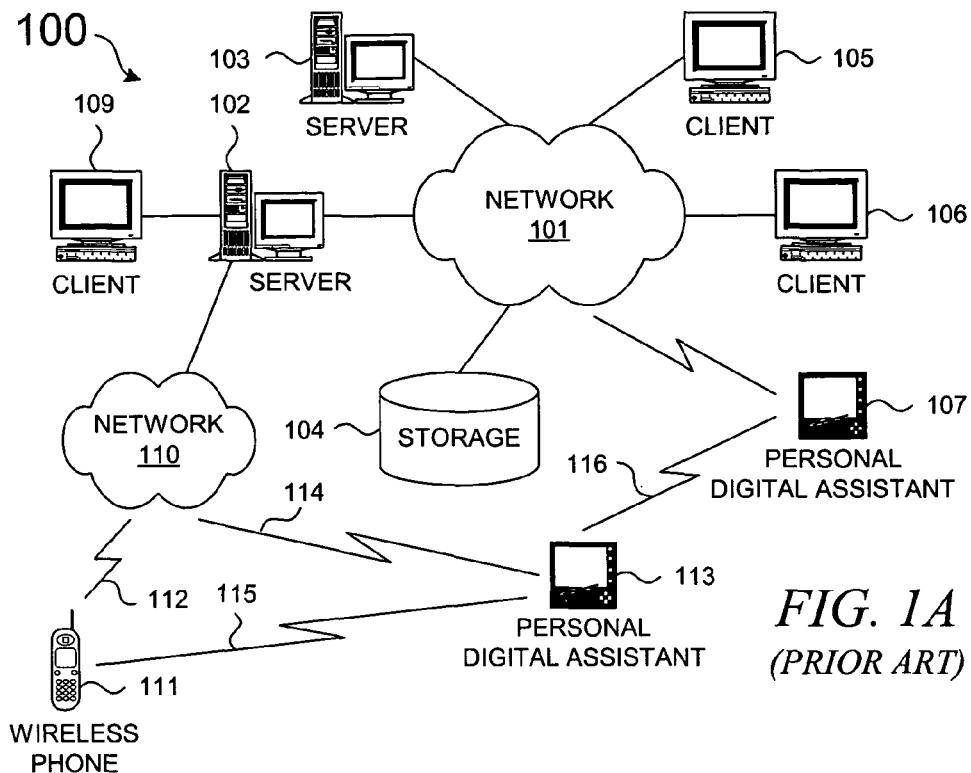
FIG. 1A depicts a typical distributed data processing system in which the present invention may be implemented.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105–107 also are connected to network 101. Clients 105–107 and servers 102–103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
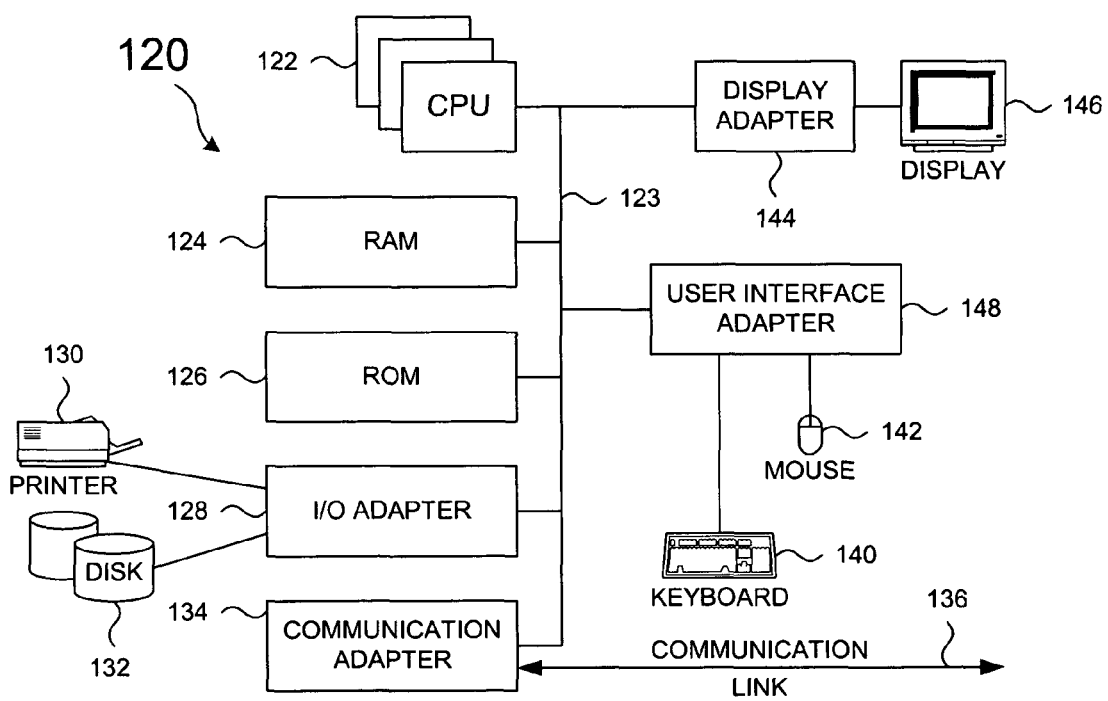
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above with respect to FIG. 1A and FIG. 1B. More specifically, though, the present invention is directed to an improved naming system, and in particular, an improved naming system for supporting the installation or deployment of applications and for a naming service for subsequent support in an execution environment for those applications.

Prior to describing the improved naming system of the present invention in more detail, a typical naming system is described, in particular, in accordance with the X/Open Federated Naming (XFN) Model, on which many naming systems are based. X/Open is an independent open-system organization that is supported by many other organizations and companies and that is dedicated to enhancing computing through practical implementations of open systems. X/Open defines a Common Applications Environment (CAE) in a set of specifications which include a set of application programming interfaces (APIs) that provide portability amongst application programs and which also include definitions of protocols to enhance interoperability of applications. The XFN specification fulfills a need for a standard naming system.

The present invention is compatible with the XFN naming model and similar naming systems and thus uses similar definitions as described within the XFN specification. A "naming convention" is a set of syntactic rules for generating a name. An "atomic name" is an indivisible component of a name as defined by the naming convention. A "compound name" represents a sequence of one or more atomic names composed according to the naming convention. For example, the pathname "/cell/nodes/node-name" is a compound name comprising a sequence of atomic names: "cell", "nodes", and "node-name"; the atomic names in a pathname are ordered left to right and are delimited by a special character, which is a slash character in this case. A naming convention enables the definition of functions for parsing any compound name, and the naming convention also determines equivalence amongst names.

The "reference" of an object contains one or more communication endpoints or addresses. A "binding" is an association of an atomic name with an object reference. In some cases, an object reference and the object to which it refers are used interchangeably. A "context" is an object whose state is a set of bindings with distinct atomic names. Every context has an associated naming convention. A context provides a lookup function, i.e., a resolution operation, which returns the reference bound to an object. An atomic name in one context object can be bound to a reference to another context object of the same type, called a "subcontext", thereby giving rise to compound names. For example, in the pathname "/cell/nodes/node-name", the atomic name "nodes" is bound in the context of "cell" to a context (and subcontext) in which "node-name" is bound. Resolution of compound names proceeds by resolving each successive atomic component in each successive context.

A "naming system" is a connected set of contexts of the same type, i.e., having the same naming convention, and providing the same set of operations with identical semantics. A "naming service" is the service that is offered to support an instance of a naming system; e.g., a naming service may be a set of APIs that provide the operations that are required to implement the syntactic rules for generating and manipulating names within the naming system. A "namespace" is the set of all names in a naming system, i.e., a namespace is an instance of a naming system. A "composite name" is a name that spans multiple naming systems.

A "federated naming system" is an aggregation of autonomous naming systems that cooperate to support name resolution of composite names through a standard interface. A "federated naming service" is the service that is offered to support an instance of a federated naming system. A "federated namespace" is the set of all possible names that are generated according to the policies that govern the relationships among member naming systems and their respective namespaces. A "naming system boundary" is the point where the namespace under the control of one member of the federation ends and where the namespace under the control of the next member of the federation begins. When one naming system is federated with another naming system, the naming system that is involved first during composite name resolution is the "superior" naming system; after resolution through the superior naming system, the next naming system is the "subordinate" naming system.

Figure 2:
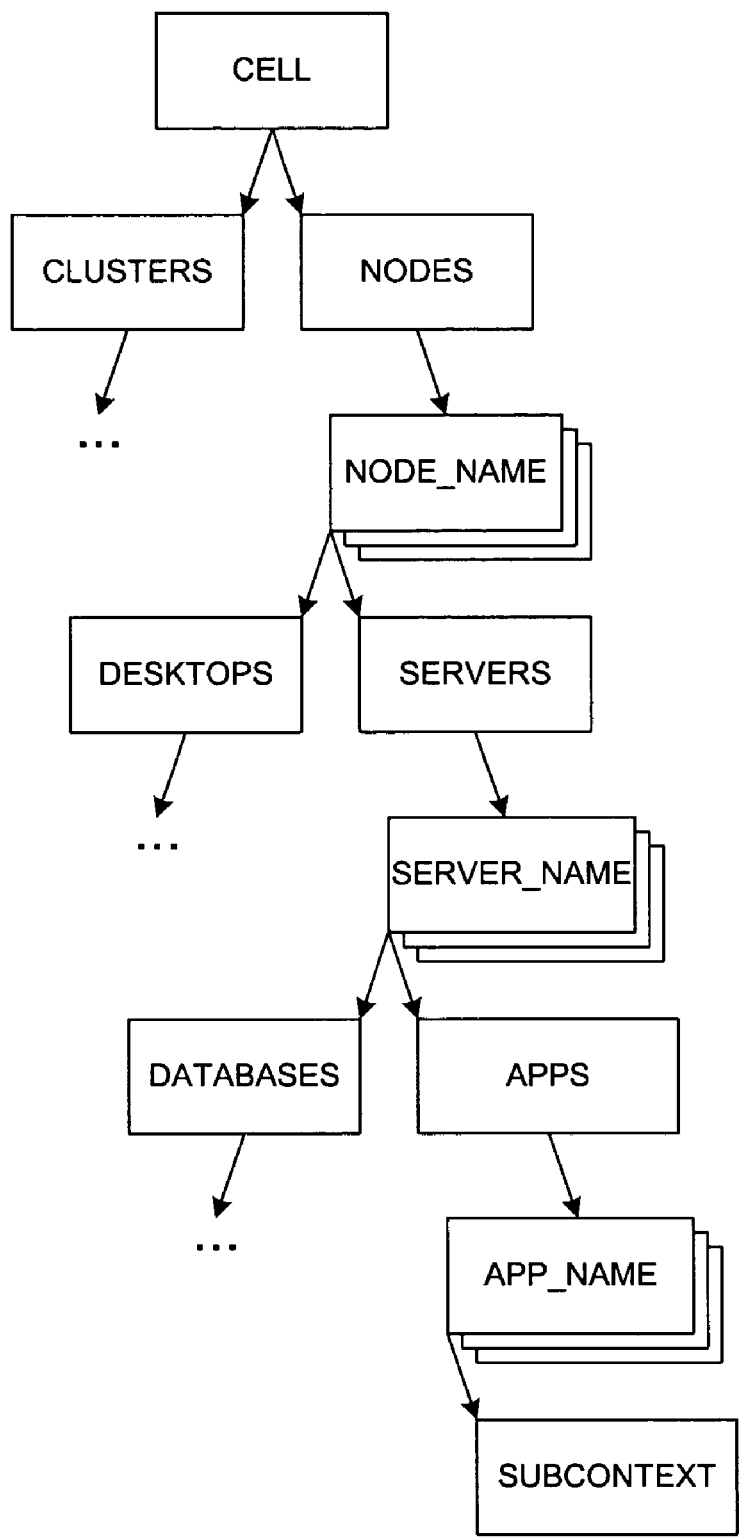
FIG. 2 depicts a block diagram that shows a representation of a typical topology-based naming system.
Figure 3:
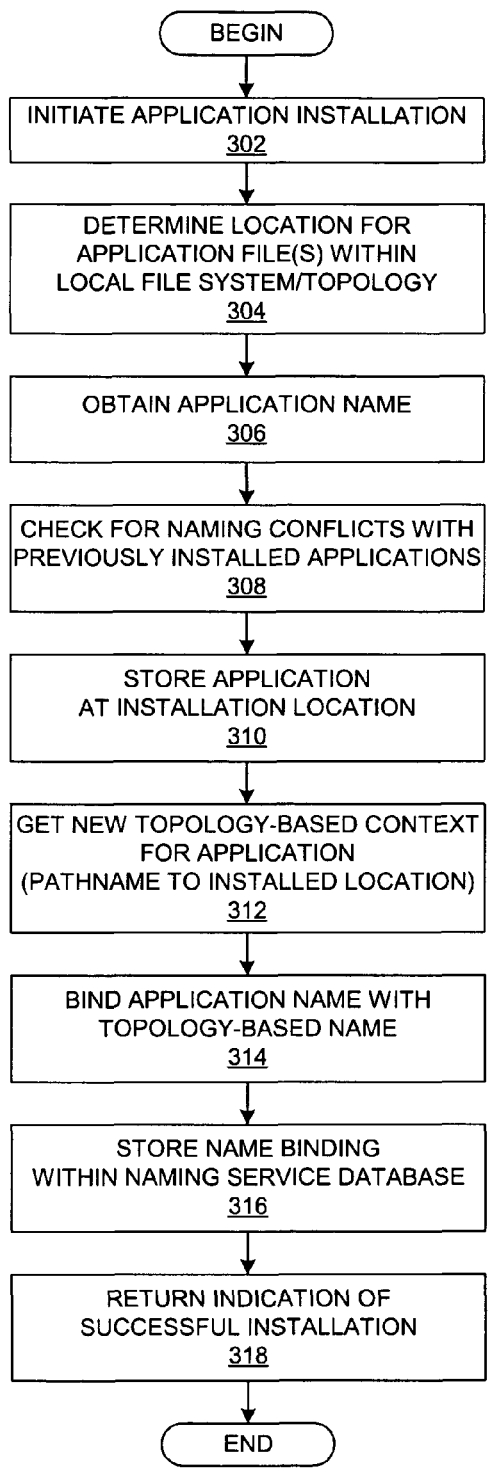
FIG. 3 depicts a flowchart that shows a typical operation for installing an application within a distributed data processing system that supports a topology-based naming system.
Figure 4:
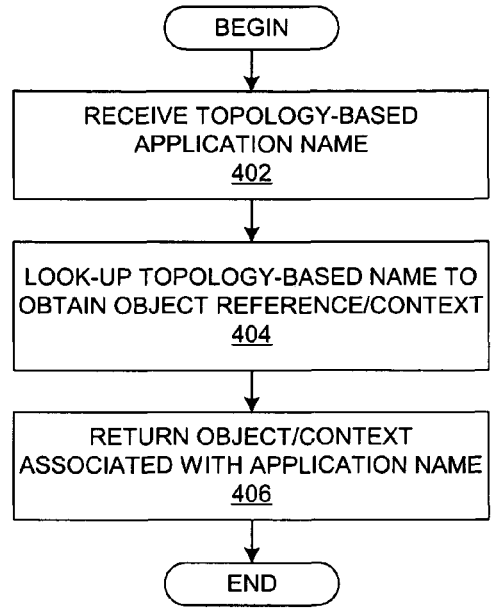
FIG. 4 depicts a flowchart that shows a typical operation for resolving an application name within a topology-based naming system.
Figure 5:
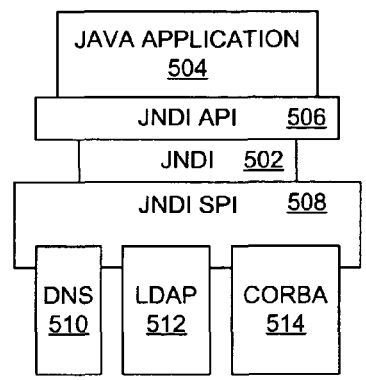
FIG. 5 depicts a block diagram that shows some of the logical components that are used in a typical Java environment to support multiple naming services.

Given the introduction above to naming system nomenclature, some additional background information is provided in FIGS. 2–5 prior to describing the naming system of the present invention in more detail, including a naming service that supports the improved naming system of the present invention. An example of a typical naming system is described with respect to FIG. 2. The description of FIG. 3 and FIG. 4 relates to typical operations for installing an application within a topology-based namespace and for resolving names within the topology-based namespace, respectively. The operations that are depicted in FIG. 3 and FIG. 4 are merely intended as examples of an interaction between a naming service and some other type of application. In addition, the depicted operations provide a basis for subsequent comparison between a typical topology-based naming system and a naming system that is implemented in accordance with the present invention. FIG. 5 provides a basis for a discussion of a naming system within a Java runtime environment.

Although a typical naming service supports many operations, e.g., for binding names, resolving names, removing bindings, renaming contexts, etc., the description of the present invention focuses on binding operations and resolving operations due to their important nature within a naming service. However, it should be noted that a naming service that is implemented in accordance with the present invention may provide a wide variety of naming-system-related operations in addition to binding operations and resolving operations.

With reference now to FIG. 2, a block diagram depicts a representation of a typical topology-based naming system. In the topology-based naming system that is shown in FIG. 2, the string "/cell/nodes/node_name/servers/server_name/apps/
app_name/"

represents a fully qualified, topology-based name that represents a location within a local file system for an application that is named "app_name"; that is, the string represents a context within a topology-based naming system. As shown in FIG. 2, a context is like any other object within a naming system, and a context can also be bound to a name within a context. Binding contexts in other contexts creates a compound name. For example, "app_name" is one of a set of multiple names that have been bound within the context "apps"; "apps" and "databases" are two names that have been bound within the context "server_name"; "server_name" is one of a set of multiple names that have been bound within the context "servers"; "servers" and "desktops" are two names that have been bound within the context "node_name"; "node_name" is one of a set of multiple names that have been bound within the context "nodes"; "nodes" and "clusters" are two names that have been bound within the context "cell". In the example that is shown in FIG. 2, each server supports a set of database files and/or a set of application files; each node supports a set of desktops and/or a set of servers; and each cell supports a set of clusters and/or a set of nodes.

In addition, the example that is shown in FIG. 2 may depict a federated naming system with two naming system boundaries. First, a cell, which is a type of domain, may be a context within a wider topology-based naming system, e.g., a naming system that is supported by a naming service for a larger distributed data processing system, such as a wide area network. Second, depending upon the operating system support that is available, applications may be permitted to support their own contexts, i.e., subcontexts, e.g., to provide access to named resources that are controlled by individual applications.

With reference now to FIG. 3, a flowchart depicts a typical operation for installing an application within a distributed data processing system that supports a topology-based naming system. The operation that is depicted in FIG. 3 may be performed by an application installation utility, an application manager, or by some other form of system manager or system configuration utility.

The operation begins with the initiation of an installation operation for an application (step 302). After determining an appropriate location within the prospective topology for storing one or more application files associated with the application to be installed (step 304), the name of the application to be installed is obtained (step 306), and a check is performed to ensure that a naming collision or conflict does not arise between the name of the application to be installed and any previously installed applications (step 308). If a conflict did exist, then the conflict could be reported to alert an appropriate system administrator or user that is responsible for initiating the installation procedure. Assuming no naming conflicts exist, the application is stored at the chosen location within the distributed data processing system (step 310), e.g., the chosen location within a local file system.

After storing the application, the application undergoes a type of registration operation with respect to the naming service. A context for the chosen installation location within the topology-based naming system is obtained (step 312), e.g., a pathname within the local filing system, and the appropriate naming service is requested to bind the newly installed application name with the topology-based name (step 314). The name binding is stored within an appropriate naming service database (step 316), and an indication of a successful installation is returned to the installation utility or system management application (step 318), thereby concluding the installation procedure.

With reference now to FIG. 4, a flowchart depicts a typical operation for resolving an application name within a topology-based naming system. The resolution operation that is depicted in FIG. 4 may be performed by any application that has a need to perform some type of subsequent operation with respect to the application that is associated with the application name, e.g., a system management application or a peer application that needs to request access to a resource that is controlled by the application.

The resolution operation begins with the receipt of a topology-based application name by a naming service (step 402). The naming service then performs a lookup operation using the received topology-based name to obtain an appropriate data entity for the target application (step 404), such as an object reference or a context, thereby mapping the application name to its associated object. The appropriate data entity, e.g., a string, is then returned to the requester (step 406), thereby concluding the resolution operation.

With respect to FIG. 5, a block diagram depicts some of the logical components that are used in a typical Java environment to support multiple naming services. The Java Naming and Directory Interface (JNDI), shown as JNDI 502 in FIG. 5, is a standard interface for providing naming and directory functionality for applications that are written in the Java programming language, such as application 504.

The conceptual model for JNDI is based on the XFN naming model. According to the JNDI specification, naming and directory services play a vital role in intranets and the Internet by providing network-wide sharing of resources, and by using JNDI, Java applications can store and retrieve any type of named Java objects. In addition, JNDI provides methods for performing standard directory operations, such as associating attributes with objects and searching for objects using their attributes.

JNDI is defined independent of any specific naming or directory service implementation. It enables Java applications to access different, possibly multiple, naming and directory services using a common API. Different naming and directory service providers can be plugged in seamlessly behind this common API. This allows Java applications to take advantage of information in a variety of existing naming and directory services, such as LDAP and DNS, and allows Java applications to coexist with legacy applications and systems. Using JNDI as a tool, the Java application developer can build new powerful and portable applications that not only take advantage of Java's object model but are also well-integrated with the environment in which they are deployed.

Referring again to FIG. 5, JNDI 502 comprises JNDI API 506, which allows a Java application to access a variety of naming and directory services, and JNDI SPI (Service Provider Interface) 508, which enables a variety of naming and directory services to be integrated into the Java runtime environment, such as DNS (Domain Name System) service provider 510, LDAP (Lightweight Directory Access Protocol) service provider 512, and CORBA (Common Object Request Broker Architecture) service provider 514.

As mentioned above, the present invention is directed to an improved naming system, and in particular, an improved naming system for supporting the installation or deployment of applications and for a naming service for subsequent support in an execution environment for those applications. With respect to FIG. 5, a naming service that is implemented in accordance with the present invention may be plugged into a Java runtime environment in a manner similar to the other naming services that are shown in FIG. 5. The description of the present invention with respect to Java runtime environments is described in more detail further below.

As mentioned previously, the use of the topology of a distributed data processing system as part of a naming system may cause certain usability problems. In other words, the use of a topology-based name (or more generally, a topology-based naming system) has inherent limitations. The most visible problem is that, at a subsequent point in time after an application has been deployed, various references to the application may be made to the application using the application's topology-based name, e.g., the application's pathname. These references may be stored within databases or application/system management files, and depending on what occurs within the distributed data processing system at a subsequent point in time, these references may need to be updated, which may require significant modifications to many files along with significant bookkeeping efforts to ensure that all appropriate updates are made.

More specifically, topology-based names of particular applications are often stored within the resource files of other applications that invoke functions within those particular applications. For example, many runtime environments provide various types of resource files for an application. These resource files are meant to externalize the resource needs of an application such that resource names or resource references do not need to be stored within an application, i.e., hard-coded within an application. A resource file becomes a type of metadata description of the runtime requirements of an application after the names of its runtime resource requirements are stored in the resource file. If an application needs to invoke a function within a module of another application, this fact is stored within the invoking application's resource file. Typically, the invoked application's or invoked module's topology-based name is stored within the resource file. In this manner, the invoking application's runtime code makes a simple reference to its resource file, most likely using a simple logical name for the resource reference, and the runtime environment then provides a lookup operation for determining a more definite topology-based name, after which an object reference or other data item is used for runtime operations.

This methodology reduces the dependency of the source code of an application on its runtime environment, thereby reducing the likelihood that the source code of an application would need to be modified based on changes in its runtime environment. However, the dependency on topology-based names necessitates significant changes throughout the distributed data processing system if resources, particularly applications or application modules, are moved within the local topology. For example, when an application needs to be moved from one server to another server, then any references to the application, i.e., any instances of the use of the topology-based name for the application within the distributed data processing system, need to be updated to reflect the location of the application's new server.

Application-based Naming System

In view of the background information that has been provided above for typical naming systems and assorted runtime components and considerations for the implementation of a typical naming system, a detailed description of the present invention is now provided. The present invention is directed to an improved naming system and to any runtime components that assist in the implementation of the improved naming system. More specifically, the present invention is directed to a novel application-based naming system rather than a topology-based naming system.

In the application-based naming system of the present invention, an application-based name is a compound name that either comprises an application name and at least one deployment name or comprises an atomic name that represents an application name and at least one deployment name. An application name is an atomic name that is associated with one or more instances of an application. A deployment name is an atomic name that is associated with a deployment attribute. A deployment attribute may include any metadata that characterizes the manner in which a particular instance of an application is deployed within a distributed data processing system. For example, a deployment attribute may characterize a series of versions of an application, each version being similar to each other yet differing in certain elements or features over a period of time. A deployment attribute may include: deployment identifier (ID), which may be a unique identifier associated with the deployment operation, wherein the identifier may be unique, for example, over all deployment operations within the distributed data processing system or over all deployment operations for versions or instances of a particular application; a version number/identifier or an edition number/identifier associated with a version of the application, e.g., a version number that increases over time to identify each iteration of improvements in a series of modifications to an application; or some other identifier for a deployment-associated characteristic or metric, such as a date on which the deployment was performed. The application-based naming system of the present invention is described in more detail below with respect to the remaining figures.

Figure 6:
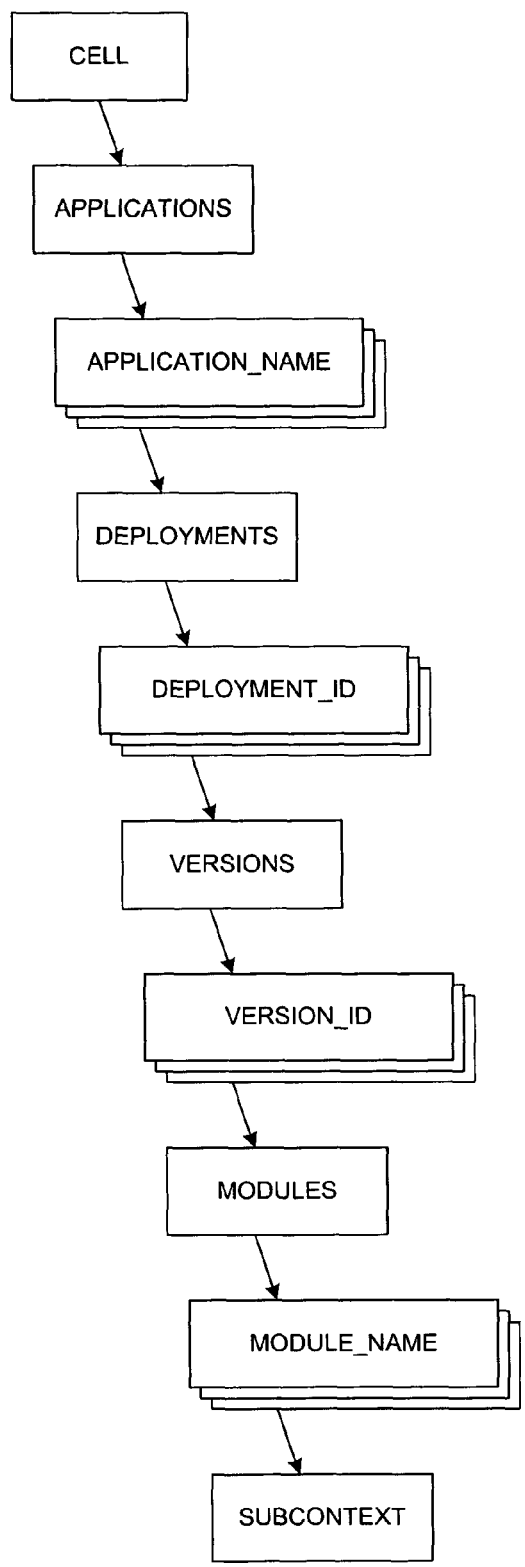
FIGS. 6 and 7 depict two different representations for an application-based naming system in accordance with the present invention.
Figure 7:
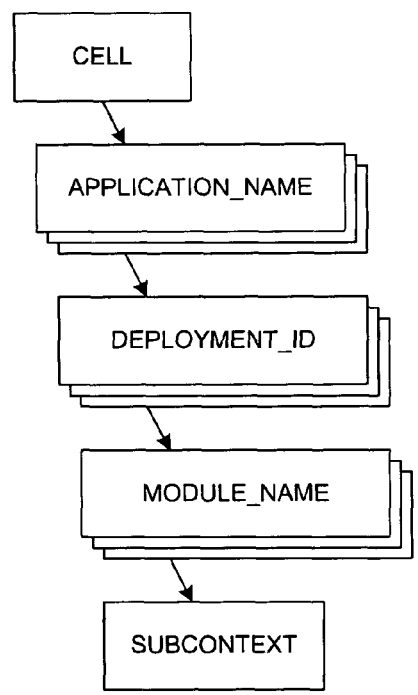

With reference now to FIGS. 6 and 7, block diagrams depict two different representations for an application-based naming system in accordance with the present invention. In the application-based naming system that is shown in FIG. 6, the string "/cell/applications/application_name/deployments/deployment_ID/versions/version_ID/modules/module_name/"

represents a fully qualified, application-based name for an application module having the module name "module_name"; that is, the string represents a context within an application-based naming system for a particular application module. A context in the application-based naming system is similar to the contexts that were described above with respect to the XFN model; binding contexts in other contexts creates a compound name.

In the example shown in FIG. 6, "applications", "deployments", "versions", and "modules" are constant or invariant context names, but they may be expanded to include variable names within a given context, e.g., for providing additional branches within a naming graph in the application-based naming system. In addition, "application_name" is one of a set of multiple names that have been bound within the context "applications"; "deployment_ID" is one of a set of multiple names that have been bound within the context "deployments"; "version_ID" is one of a set of multiple names that have been bound within the context "versions"; and "module_name" is one of a set of multiple names that have been bound within the context "modules".

The example that is shown in FIG. 6 may depict a federated naming system with two naming system boundaries. First, a cell may be a context within a superior naming system, e.g., a naming system that is supported by a naming service for a larger distributed data processing system. Second, depending upon the operating system support that is available, applications may be permitted to support their own contexts, i.e., subcontexts, e.g., to provide access to named resources that are controlled by individual applications. In this manner, the application-based naming system of the present invention is able to be federated with both superior and subordinate naming systems.

In the example that is shown in FIG. 6, an application is assumed to comprise multiple modules. However, in a different embodiment in which an application comprises a single module, there may be no need for a context that corresponds to application modules; in other words, in a different embodiment, the application-based naming system may conclude the naming graph after "deployment_ID".

Referring now to FIG. 7, an alternative application-based naming system is depicted in which the constant or invariant contexts "applications", "deployments", "versions", and "modules" are removed as compared with FIG. 6. In the example of FIG. 7, the string "/cell/application_name/deployment_ID/module_name/"

represents a fully qualified, application-based name for an application module having the module name "module_name"; that is, the string represents a context within an application-based naming system for a particular application module. As noted above, an application-based naming system that is implemented in accordance with the present invention supports compound names that comprise an application name and at least one deployment attribute, and in the example of FIG. 7, "deployment_ID" represents the minimum single deployment attribute within an application-based name; "version_ID" as part of an application-based name has been removed in the representation of FIG. 7 as compared with FIG. 6. In other embodiments of the present invention, additional deployment attributes may be included in an application-based name. Again, in FIG. 7, an application is assumed to comprise multiple modules. However, in a different embodiment in which an application comprises a single module, the application-based naming system may conclude the naming graph after "deployment_ID".

The following strings are some examples of application-based names that comprise a variety of deployment information. As is the case with any computer-related name, the names in these examples have meaning only within a given computational environment; in other words, the names in these examples would be valid only within a given data processing system. In other words, the names in these examples could be resolved or mapped to particular contexts or resources only within a given data processing system. Hence, it is noted that the explanation of the names in these examples necessarily incorporates information about a hypothetical data processing system that supports these names.

EXAMPLE 7-1

"/austin_TestBed/WebServ/Vers0-9-a/Lookup/"

In example 7-1, "austin_TestBed" refers to a context that acts as a root within an application-based naming system. This particular context organizes all application files for applications that are in a test phrase of their development by the Austin-based office of a particular enterprise. "WebServ" refers to a context that organizes all files relating to "WebServ", which is a particular application name for an application that is being developed by the enterprise. "Vers0-9-a" is a deployment attribute that has been used as a context that organizes all files that are related to a particular deployed version (version 0.9 alpha) of the "WebServ" application. "Lookup" refers to a context that organizes all files relating to a lookup module within the "WebServ" application, e.g., a set of dynamic link library (DLL) files or other types of executable files.

EXAMPLE 7-2

"/austin_TestBed/WebServ/Vers0-9-b/Lookup/"

Example 7-2 is similar to example 7-1 except that the deployment attribute in example 7-2 is set to "Verso-9-b" compared to the deployment attribute of "Vers0-9-a" in example 7-1. In example 7-2, "Vers0-9-a" is a deployment attribute that has been used as a context that organizes all files that are related to a particular deployed version (version 0.9 beta) of the "WebServ" application.

EXAMPLE 7-3

"/server/serverX/DB2/2003Jan01/"

In example 7-3, "server" refers to a context that acts as a root within an application-based naming system. This particular context organizes all servers of a particular enterprise. "serverX" refers to a context for a particular server. "DB2" refers to a context that organizes all files relating to "DB2", which is a particular application name. "2003Jan01" is a deployment attribute that has been used as a context that organizes all files that are related to a particular deployment of the "DB2" application, e.g., the deployment of the application that occurred on the particular date.

EXAMPLE 7-4

"/server/serverX/DB2/2003July01/"

Example 7-4 is similar to example 7-3 except that the deployment attribute in example 7-4 is set to "2003July01" compared to the deployment attribute of "2003Jan01" in example 7-2. In example 7-4, "2003July01" is a deployment attribute that has been used as a context that organizes all files that are related to a particular deployment of the "DB2" application.

These deployment attributes, such as "Vers0-9-a" or "2003July01", may originate from a variety of sources: from a system administrator; from a system management application that controls the deployment of applications; or from some other source.

Figure 8:
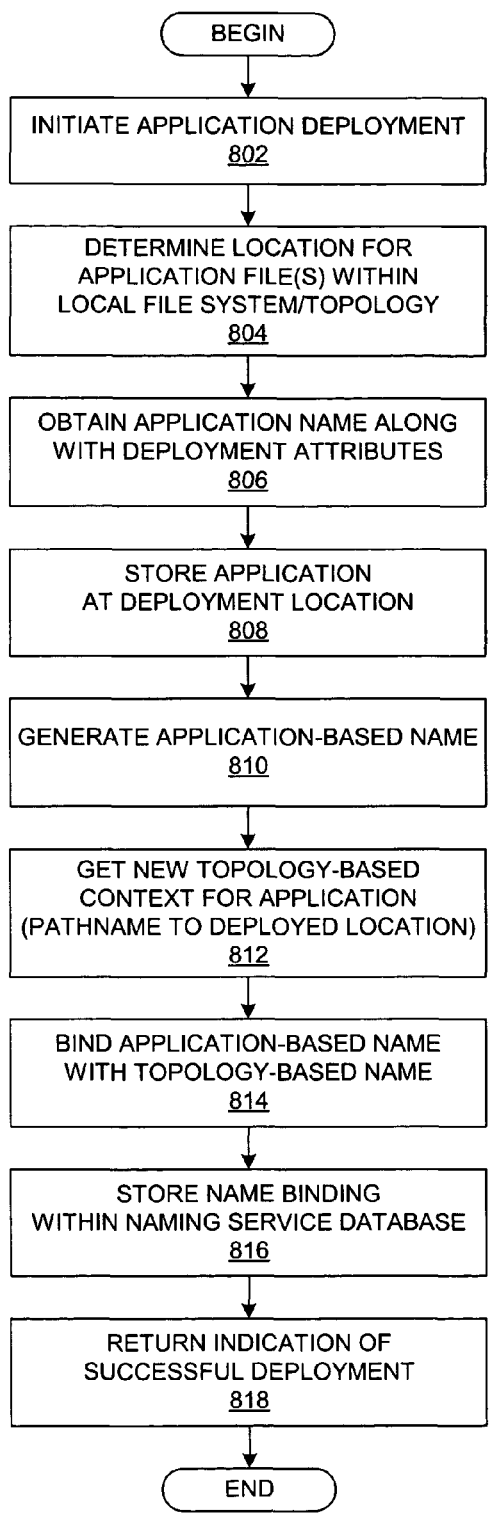
FIG. 8 depicts a flowchart that shows an operation for deploying an application within a distributed data processing system that supports an application-based naming system.

With reference now to FIG. 8, a flowchart depicts an operation for deploying an application within a distributed data processing system that supports an application-based naming system. The process that is shown in FIG. 8 is substantially similar to the process that is shown in FIG. 3 except that FIG. 8 shows the use of application-based names. The operation that is depicted in FIG. 8 may be performed by an application installation utility, an application manager, or by some other form of system manager or system configuration utility. The depicted operation is meant to illustrate merely one exemplary operation in which application-based names are used within a distributed data processing system.

The operation begins with the initiation of a deployment or installation operation for an application (step 802). After determining an appropriate location within the prospective topology for storing one or more application files associated with the application to be deployed (step 804), the name of the application to be deployed is obtained along with various deployment attributes associated with the application (step 806). The application name, deployment attributes, etc., may be retrieved from an application configuration file that would have been associated with the application or application module.

If appropriate, a check may be performed to ensure that a naming collision or conflict does not arise between the name of the application to be deployed and any previously deployed applications. If a conflict did exist, then the conflict could be reported to alert an appropriate system administrator or user that is responsible for initiating the deployment procedure. Assuming no naming conflicts exist, the application is stored at the chosen location within the distributed data processing system (step 808), e.g., the chosen location within a local file system.

After storing the application, the application undergoes a type of registration operation with respect to an application-based naming service. An application-based name is generated for the deployed application based on its application name and one or more deployment attributes (step 810). A topology-based context for the chosen deployment location within the distributed data processing system is obtained (step 812), e.g., a pathname within the local filing system, and the application-based naming service is requested to bind the application-based name of the newly deployed application with the topology-based name for the context in which it was deployed (step 814). The name binding is stored within an appropriate naming service database (step 816), and an indication of a successful deployment is returned to the deployment utility or system management application (step 818), thereby concluding the deployment procedure. It should be noted that the deployment operation that is shown in FIG. 8 depicts a single application file/module that is being deployed, but if an application comprises multiple modules, then the process that is shown in FIG. 8 would be repeated for each application module that is to be deployed, and each module name would also be used during the generation of the appropriate application-based name.

Figure 9:
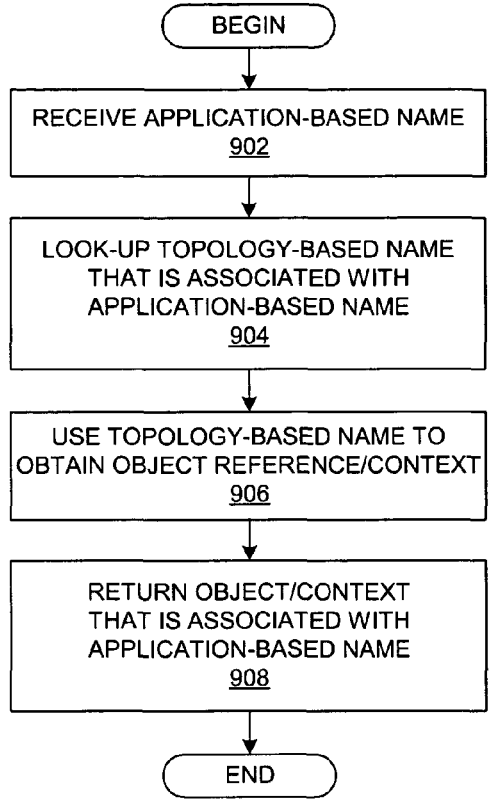
FIG. 9 depicts a flowchart that shows an operation for resolving an application-based name within an application-based naming system to a topology-based name for subsequent use within a distributed data processing system.

With reference now to FIG. 9, a flowchart depicts an operation for resolving an application-based name within an application-based naming system to a topology-based name for subsequent use within a distributed data processing system. The resolution operation that is depicted in FIG. 9 may be performed by any application that has a need to perform some type of subsequent operation with respect to the application that is associated with the application-based name, e.g., a system management application or a peer application that needs to request access to a resource that is controlled by the application.

The resolution operation begins with the receipt of an application-based name by a naming service (step 902). The naming service then performs a lookup operation using the received application-based name (step 904), thereby mapping the application-based name to its associated topology-based name. The topology-based name is then used to obtain an appropriate data entity for the target application (step 906), such as an object reference or a context, possibly through another service. The appropriate data entity is then returned to the requester (step 908), thereby concluding the resolution operation.

In this example, an application-based name provides a layer of abstraction or indirection over an topology-based name, which is then used within the runtime environment to obtain object references or other data. However, depending on the operating system and its dependence on the naming service, the application-based name may be able to be mapped directly to an object reference, context, or other appropriate data object for the result of the name resolution operation. In the case of resolving an application-based name for an application or for an application module, it is contemplated that the result of a resolution operation would be a context object for the server root wherein the application or the application module is deployed or installed. In this manner, the named resources of the application or the application module are relative to the server root context while still accessible through JNDI. If an application comprises multiple modules, each of the modules may map to different server root contexts.

The application-based naming system of the present invention provides numerous advantages for application and resource management over a topology-based naming system. With the present invention, application-based names are independent of the server topology within a distributed data processing system. Application-based names remain close to an application developer's view or a user's view of an application, i.e., an instance of an application is potentially only one instance of many deployed instances of an application within a distributed data processing system or potentially only one instance of many versions of an application.

Application-based Naming System Including Aliases

Figure 10:
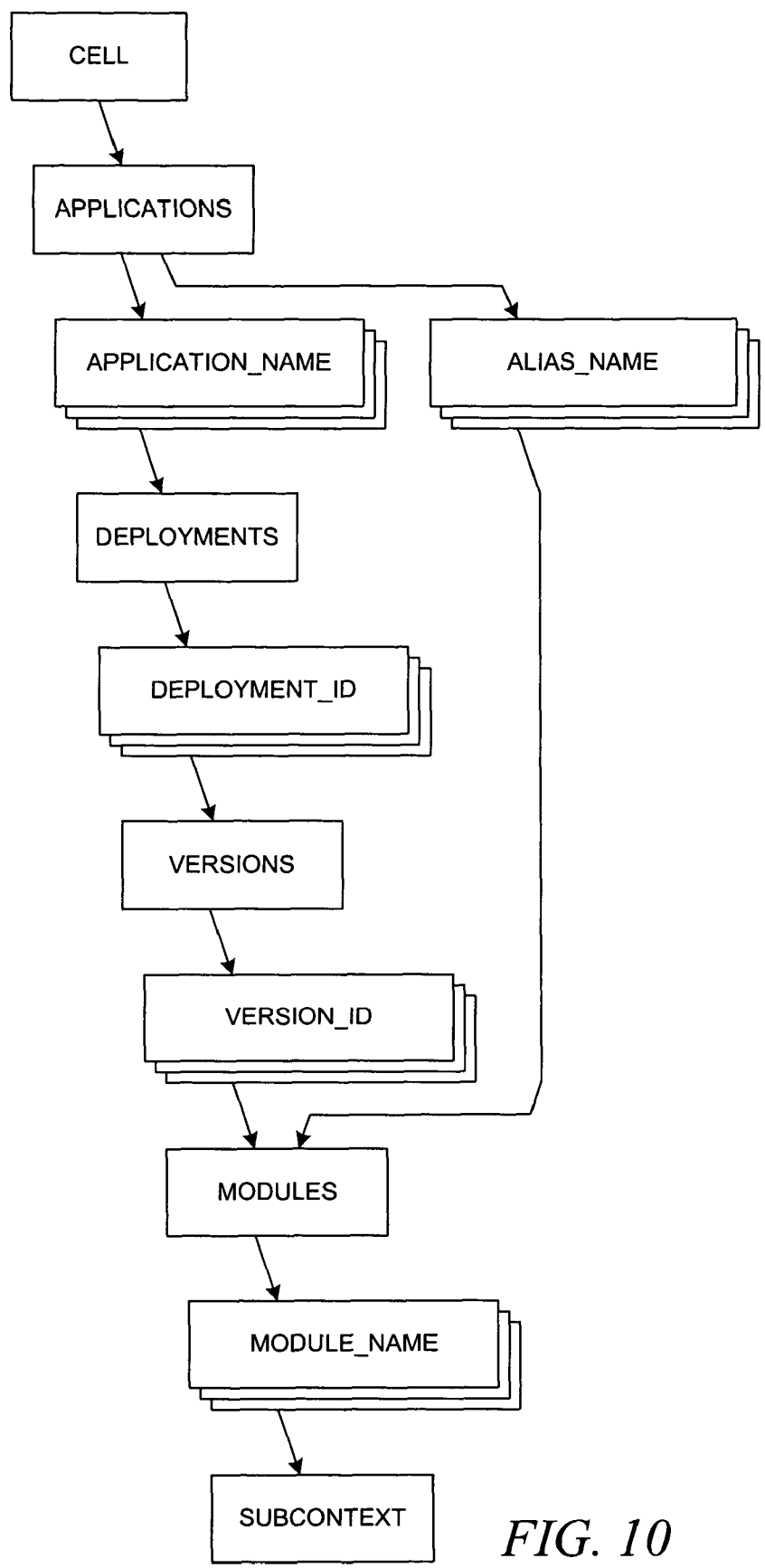
FIG. 10 depicts a block diagram that shows a representation for an application-based naming system that includes aliases.

With reference now to FIG. 10, a block diagram depicts a representation for an application-based naming system that supports aliases in accordance with an embodiment of the present invention. Although the application-based naming system that is shown in FIG. 10 is similar to FIG. 6, FIG. 10 illustrates the addition of support for aliases in which multiple hierarchical contexts within an application-based name are replaced with an alias name, as explained in more detail further below.

As illustrated in FIG. 6, an application-based naming system that is implemented in accordance with the present invention supports compound names that comprise an application name and at least one name representing a deployment attribute. As illustrated in FIG. 10, an application-based naming system may also include support for alias names. An alias name (or more simply, an alias) is defined as an atomic name that represents an application name and a name representing a deployment attribute. An application-based name that includes an alias name may also be described as an aliased application-based name; an application-based name that does not include an alias name may also be described as a non-aliased application-based name.

An alias name may be implemented as a string; this string may or may not comprise substrings for an application name and substrings for one or more deployment attributes. For example, the string for an alias name may be a string having a value of a particular application name, e.g., "WebServ", prepended to a string having a value of a particular deployment attribute, e.g., "2003-01", wherein the substrings for the application name and the deployment attribute are appended yet delimited by a special character, e.g., "WebServ+2003-01".

As is explained further below, though, an alias name represents the information in an application name and associated deployment attributes, so an alias name would usually be a simple string, e.g., "myWebServ". In a preferred embodiment, in order to interpret an alias name, the alias name is registered with an application-based naming service, which stores the alias name in association with a compound name; this associated compound name contains a set of atomic names, which are the application name and at least one name representing a deployment attribute. In different embodiments of the present invention, the number of deployment attributes in an aliased application-based name may vary, so the number of deployment attributes that are represented by an alias name may vary.

Again, in FIG. 10 as in previous figures, an application is assumed to comprise multiple modules. However, in a different embodiment in which an application comprises a single module, the application-based naming system may conclude the naming graph after "alias_name".

Compared with FIG. 6, FIG. 10 depicts an alternative application-based naming system; as in FIG. 6, a context in the application-based naming system in FIG. 10 is similar to the contexts that were described above with respect to the XFN model; binding contexts in other contexts creates a compound name.

It should be noted that FIG. 10 illustrates that aliased application-based names can be implemented within a particular implementation of an application-based naming service in parallel with non-aliased application-based names, i.e., application-based names that do not include aliases. However, aliased application-based names provides a certain amount of advantages over non-aliased application-based names. As explained above, application-based names present an application-centric view of an installed application, which can be compared with prior art solutions, which provide topology-based names that present a topology-centric view of an installed application. Likewise, another embodiment of the present invention provides aliased application-based names that present a logical view of an application that is variable to the needs of the users of a data processing system; an aliased application-based name may be free from topological information yet encumbered with deployment-related information.

In the application-based naming system that is shown in FIG. 10, the string

"/cell/applications/alias_name/modules/module_name/"

represents a fully qualified, application-based name for an application module having the module name "module_name"; that is, the string represents a context within an application-based naming system for a particular application module. The alias name, which is "alias_name" in the example that is shown in FIG. 10, is an atomic name that is associated with a context in a manner similar to the manner in which other atomic names within an application-based name are associated with contexts in an application-based naming system. The alias name, though, differs from other names within an application-based name because it represents a compound name which comprises an application name and at least one name representing a deployment attribute.

It should be noted that, in both FIG. 6 and FIG. 10, the name "applications" is used for illustrative purposes only; it represents a particular context within a given application-based naming system and should not be confused with the descriptive term "application-based" that is applied to the present invention. For example, in a given data processing system on which the present invention has been implemented, one may assume that the particular name "applications" has been selected as mentally helpful to users of the given data processing system in managing or maintaining the system, e.g., all applications are organized in a hierarchical manner under a particular context, which might be compared with all databases that have been organized in a hierarchical manner under a different context.

The use of aliases provides a mechanism for efficiently compacting fully qualified names within an application-based naming system in which multiple deployment attributes are employed. For example, an application-based naming system in which five deployment attributes are specified along with constant or invariant context names for organizing those attributes would result in very long names, whereas an aliased name within the same application-based naming system would be much shorter, much easier to remember, and much easier to use, both humanly and programmatically.

In FIG. 10, an alias name is an atomic name that represents a compound name comprising an application name and four deployment-related names. In other words, an alias name is a string having a value; in the example in FIG. 10, the string value of the alias name is shown as "alias_name". This alias name is associated with a compound name, and this compound name comprises an application name and at least one name representing a deployment attribute. This association between the alias name and the compound name is registered within a naming service that has support for an application-based naming system, i.e., an application-based naming service. Hence, this association may be retrieved from the application-based naming service for subsequent use.

This associated compound name may be described as an application-based name because an application-based name, as was previously defined above, can contain an application name and at least one name representing a deployment attribute. The compound name that is associated with an alias name cannot comprise another alias name. Hence, an alias name represents a compound name that may be described as a non-aliased application-based name, i.e., an application-based name that does not comprise an alias name.

In the example in FIG. 10, the set of atomic names in the compound name that is associated with the alias name, i.e., the compound name that is represented by the alias name, comprise the following: an atomic name for a particular application, e.g., "application_name", that is associated with an application that is being managed within the data processing system; the atomic name "deployments", which represents a constant or invariant context for organizing deployments of the application that was identified in the superior context, i.e., "application_name"; an atomic name having a value for a deployment identifier, e.g., "deployment_ID"; the atomic name "version", which represents a constant or invariant context for organizing versions of the deployed application; and an atomic name having a value for a version identifier, e.g., "version_ID".

A naming service that supports an application-based naming system would resolve aliased application-based names in a manner similar to non-aliased application-based names. Hence, aliased application-based names must be unique within the superior context in which an alias context is employed. In the example shown in FIG. 10, an aliased application-based name must be unique within a cell; however, multiple unique aliased application-based names may resolve to the same object, e.g., an application module or a data file that is associated with an application; in other words, there may be a many-to-one mapping of aliases to objects, as is illustrated further below.

Installation and Management of Applications in a Data Processing System that Supports Aliased Application-based Names As mentioned above with respect to FIG. 10, an aliased application-based name provides certain advantages over a non-aliased application-based name. One of the advantages of using aliased application-based names is that the installation and management of applications becomes more efficient, e.g., moving the physical location of an application and installing multiple instances of an application. The manner in which an embodiment of the present invention may provide these efficiencies is described hereinbelow.

As mentioned previously, the names of files that are needed by an application while it is executing are often stored within the application's resource files, thereby reducing the dependency of the source code of an application on its runtime environment and reducing the likelihood that the source code of an application would need to be modified based on changes in its runtime environment, such as its deployed location. Those files may be integrated or associated in some manner with the application. However, the files that are needed by an application may be integrated or associated with some other application, e.g., applications that export functionality for the use of other applications; the names of these files may be maintained in a resource file that is associated with the application. In the prior art, the names of these files are dependent upon the topology of the data processing system in which they are stored; in other words, in the prior art, the names of these files are topology-based.

The use of topology-based names within resource files and other points within a data processing system cause certain problems or inefficiencies. For example, when an application is moved within a system, e.g., from one server to another server, the locations of the application files within the topology of the data processing system are changed, and the topology-based names of those files must also change. Any references to the topology-based names of the application files, e.g., any references within resource files, must be updated to reflect the new location of the application files. As another example, when an instance of a particular version of an application is installed on a server, it is usually identified by an application name and a version number; while it is typical to store multiple versions of an application on a single server, it is typically cumbersome to install multiple instances of a particular version of an application on a single server. These types of problems are alleviated within a data processing system that provides support for an application-based naming system.

The advantage of using application-based names can be illustrated using an example of a Java runtime environment. In a prior art runtime environment for a distributed data processing system, a federated naming system is supported in which each J2EE (Java2 Platform, Enterprise Edition) application server has its own context; multiple instances of a J2EE application can be deployed within the runtime environment on different J2EE application servers. A fully qualified topology-based name is generated by federating the naming system of the distributed data processing environment with the naming system of the J2EE runtime environment; JNDI provides access to the resulting federated namespace for the J2EE applications. In a given runtime environment, a J2EE application can reference the context of another J2EE application within the given runtime environment's federated namespace through calls to appropriate methods that are provided by JNDI APIs. For example, a fully qualified topology-based name like "/cell/nodes/node-name/servers/server-name/EJBHome" can be used by a J2EE application to reference the context of another remote J2EE application.

J2EE applications are comprised of servlets and other EJBs (Enterprise JavaBeans). Every EJB has associated information that is declared in the EJB's deployment descriptor, which contains metadata for various attributes of an EJB. Since its environment information is external to the EJB's source code, an EJB can be somewhat customized without changing the EJB's source code. With EJB deployment descriptors, the platform transparency of an EJB can be maintained while only the deployment information needs to be altered for each target platform.

In this manner, EJB deployment descriptors are a type of resource file as previously described above, and hence, EJB deployment descriptors have one of the problems that was mentioned above. Topology-based names for the data processing system are often stored within EJB deployment descriptors and other types of deployment descriptor files, thereby causing usability problems when J2EE applications are moved from one server to another server or when the need arises for installing more than one instance of an application. For example, a J2EE client application may have one or more "<ejb-ref>" definitions in its deployment descriptors, and each of these EJB references may comprise a topology-based name for a module, an EJB, or a file that is associated with another J2EE application; when the other J2EE application is moved from one server to another server, the J2EE client application's deployment descriptors need to be modified to use the topology-based name for the new location.

With the present invention, J2EE applications can be managed within an application-based naming system, and the use of an application-based naming system can simplify application installation and management. A J2EE client application can reference a named resource in the namespace or context of a J2EE application using the J2EE application's installation information, such as the J2EE application binary name, deployment ID, and module name. The application developer or the application assembler does not need to know the J2EE application server's topology information, such as node name and server name within an enterprise domain. Even though the J2EE application installation information is defined statically, i.e., the application installation information does not vary dynamically after an application is installed, the J2EE client application's deployment descriptors do not necessarily need to be changed, even if a J2EE application is moved from one server to another server, e.g., for the purpose of load balancing purpose or for some other purpose.

During configuration of an application within a system, an application management utility would use the deployment information of the application to register an application-based name with an application-based naming service; the deployment information might be retrieved from application configuration files that are associated with the application modules. The application-based naming service may store the application-based name in association with file system information for the application files, e.g., the topology-based names for the locations of those application files; this association is stored in a database, a registry file, or some other type of datastore, and the association may be retrieved through a lookup operation. In this manner, a binding may be created between an application-based name for an application module and a topology-based name, e.g., pathname, of the application module's server. Once the application-based name is generated for the application module, the application subcontext and objects can be referenced through an application-based naming service using the appropriate application-based name.

Figure 11A:
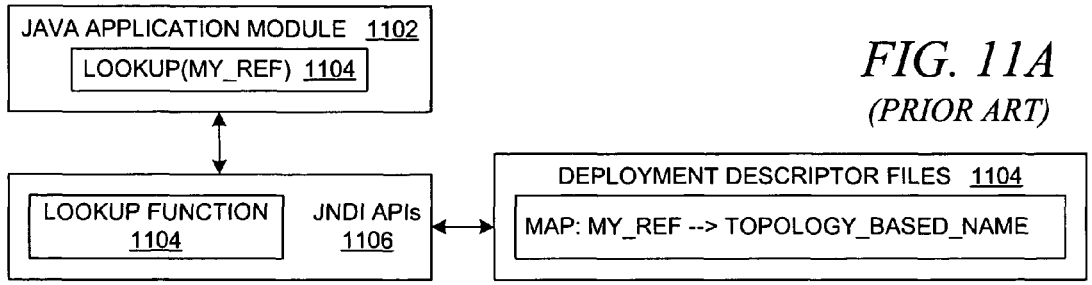
FIG. 11A depicts a block diagram that shows a typical J2EE environment for an installed Java application.

With reference now to FIG. 11A, a block diagram illustrates a typical J2EE environment for an installed Java application. Java application module 1102 needs to use an application function or an EJB that is part of another application. Java application module 1102 contains function call 1104 to a lookup function using a local reference name for the remote module. When function call 1104 is executed, JNDI lookup function 1106 is called within Java runtime environment 1108. With reference to various deployment descriptor files 1110, such as an EJB deployment descriptor file, an application deployment descriptor file, or some other type of similar resource file, lookup function 1106 is able to map the provided local reference name to a topology-based name. Java application module 1102 uses the topology-based name through appropriate APIs to obtain access to the required remote functionality.

Figure 11B:
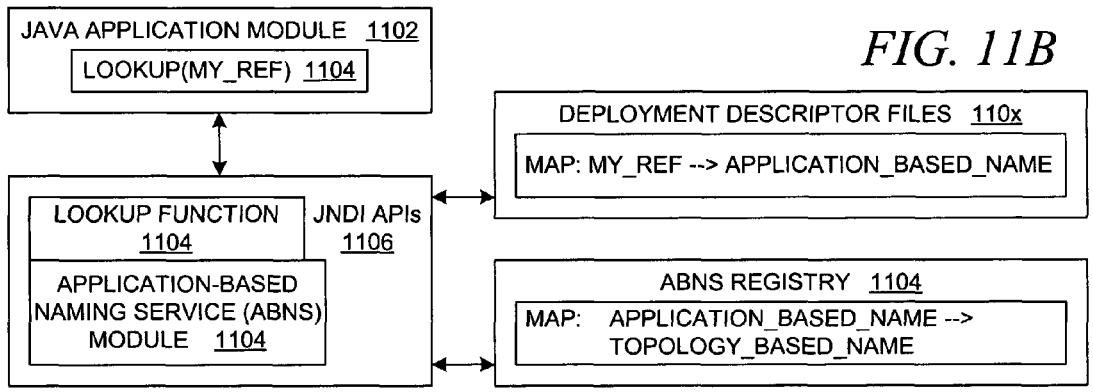
FIG. 11B depicts a block diagram that shows a modified J2EE environment that supports an application-based naming service.

FIG. 11B is similar to FIG. 11A except that FIG. 11B depicts an embodiment of the present invention within a data processing system. Similar reference numerals in FIG. 11A and FIG. 11B refer to similar elements, thereby illustrating that certain aspects of the data processing system remain unchanged when a typical data processing system is modified to include the functionality of the present invention.

The J2EE specification defines several distinct roles in the application development and deployment life cycle, e.g., application developer, enterprise bean provider, application assembler, and system administrator. In general, the roles are defined to aid in identifying the tasks performed by various parties during the development, deployment, and running of a J2EE application; some of these roles perform tasks that are common to non-J2EE platforms, while other roles have a meaning specific to the J2EE platform. The roles can be fulfilled by whatever personnel match an organization's actual application development and deployment workflow. Thus, each J2EE role may be performed by a different person, or a single person may perform several roles. For example, a given programmer may perform the roles of application developer and application assembler.

Since the present invention can be implemented within a J2EE environment, the above-noted roles remain substantially unchanged. In the example shown in FIG. 11B, an application developer would create application modules in the same manner whether or not the application will be deployed within a data processing system that supports the present invention. For example, an application developer may create EJBs and various application modules, including the specification of an "ejb-ref" in a deployment descriptor; the "ejb-ref" specifies a name, e.g., "myHello", that the application uses in its program logic to refer to a particular EJB.

Likewise, an application assembler bundles various modules into an application; during this process, the application assembler chooses a JNDI name for the EJB, e.g., "ejb/myHello". The application assembler specifies a name to which the defined "ejb-ref" is resolved; this name represents the client module that the EJB needs to use during runtime execution. In the prior art, the specified name would be a topology-based name, such as "cell/node/server/ejb/hello". In contrast, the present invention allows the specification, as shown in FIG. 11B, of an application-based name, such as "cell/appl_name/vers_id/deploy_id/module/ejb/hello".

With reference now to FIG. 11B, a block diagram illustrates a modified J2EE environment that supports an application-based naming service in accordance with an embodiment of the present invention. The lookup function in JNDI APIs 1108 has been modified; lookup function 1120 has been extended to include support for application-based naming service (ABNS) module 1122. Deployment descriptor files 1110 contain references to application-based names. In addition, ABNS module 1122 has access to ABNS registry 1124, which contains associations between application-based names and topology-based names. When function call 1104 is executed, JNDI lookup function 1120 is called within Java runtime environment 1108. With reference to various deployment descriptor files 1110, such as an EJB deployment descriptor file, an application deployment descriptor file, or some other type of similar resource file, lookup function 1120 is able to map a provided local reference name to a more globally recognized name.

In one embodiment of the present invention, a data processing system that includes the present invention uses only application-based names in the resource files. Thus, when a global name is retrieved, it may be assumed to be an application-based name and not a topology-based name. In another embodiment of the present invention, both application-based names and topology-based names may be used within the resource files, and the lookup function should be able to support both types of names. Hence, when a name is retrieved from a file, other information that characterizes the name may also be retrieved, such as an associated data type identifier that indicates whether the retrieved name is an application-based name or a topology-based name.

In any case, lookup function 1120 relies on ABNS module 1122 to perform additional processing on application-based names, and ABNS module 1122 maps an application-based name to a topology-based name in accordance within information in ABNS registry 1124. Java application module 1102 uses the returned topology-based name through appropriate APIs to obtain access to the entity that has been identified, e.g. for invoking a remote object.

Figure 11C:
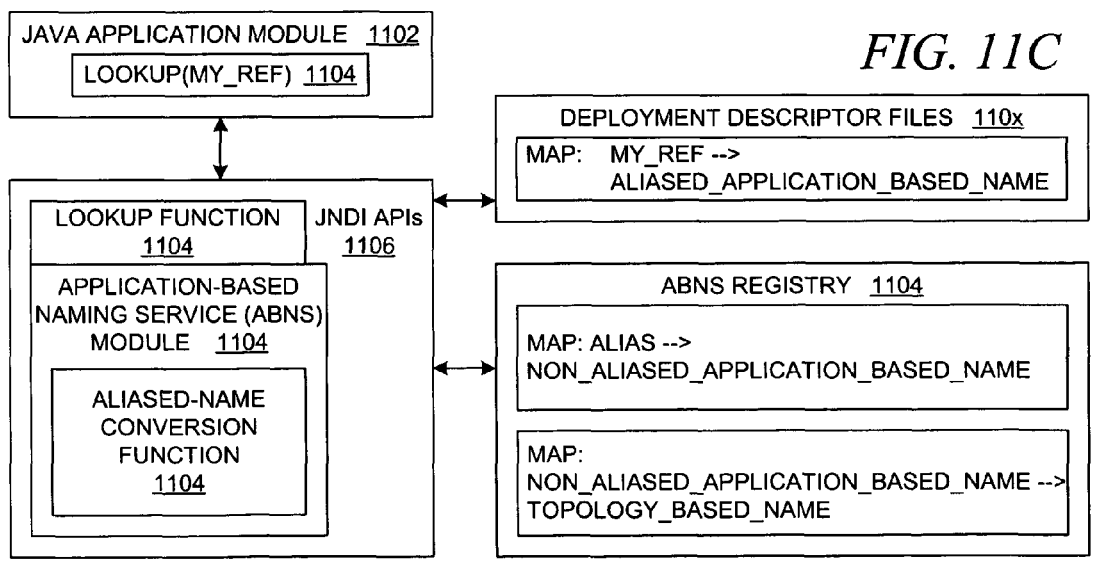
FIG. 11C depicts a block diagram that shows a modified J2EE environment that includes an application-based naming service with additional support for aliased application-based names.

With reference to FIG. 11C, a block diagram illustrates a modified J2EE environment that includes an application-based naming service with additional support for aliased application-based names in accordance with an embodiment of the present invention. Similar reference numerals in FIG. 11B and FIG. 11C refer to similar elements. FIG. 11C is similar to FIG. 11B except that FIG. 11C depicts an embodiment of the present invention for supporting aliased application-based names, whereas in FIG. 11B, the depicted system does not incorporate any functionality for supporting the concept of alias names.

Referring to FIG. 11C, ABNS module 1130 has been extended to include functionality for converting aliased application-based names to non-aliased application-based names, which is shown as aliased name conversion function 1132. ABNS registry 1134 contains additional information, which are associations between alias names and non-aliased application-based names. Although ABNS registry 1134 still contains associations between application-based names and topology-based names, the application-based names in these associations are specified as non-aliased application-based names.

When an application is installed in the system shown in FIG. 11C, the roles of application developer and application assembler again remain essentially unchanged. However, the application assembler may use aliased application-based names within the deployment descriptor files, such as "cell/alias1/module/ejb/hello". The implications of using an aliased application-based name, i.e., using an alias as part of an application-based name, is resolved within the lookup functionality, as described in more detail with respect to FIG. 12.

Figure 12:
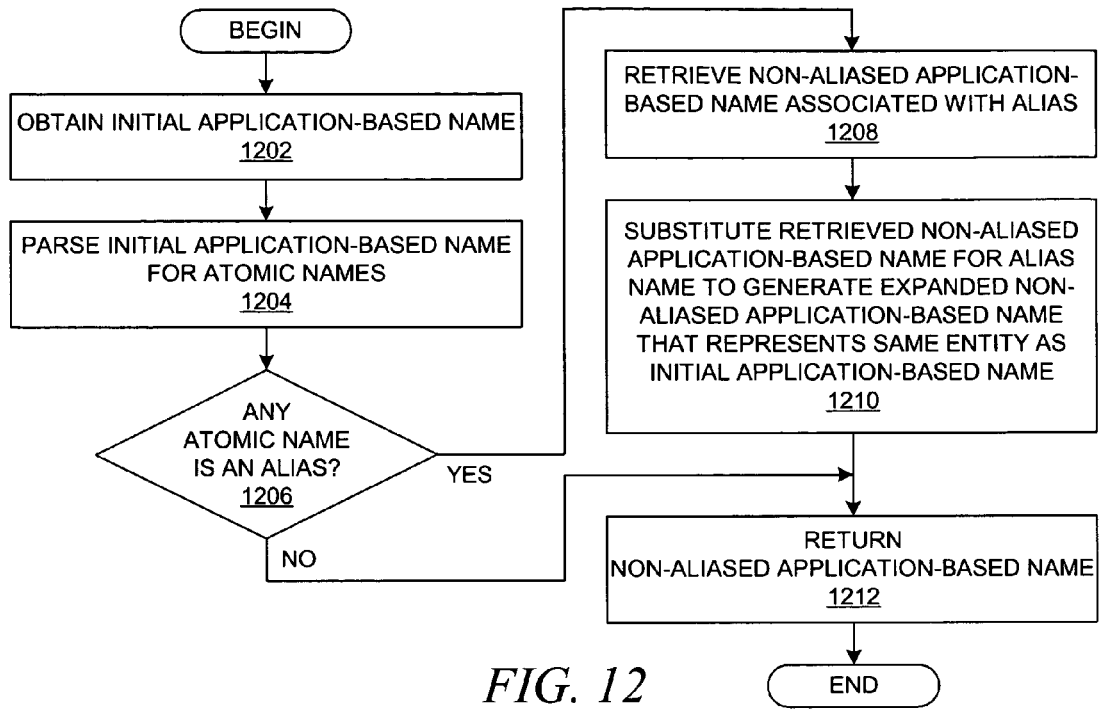
FIG. 12 depicts a flowchart that shows a process for transforming an aliased application-based name to a non-aliased application based-name.

With reference now to FIG. 12, a flowchart depicts a process for transforming an aliased application-based name to a non-aliased application based-name. The process that is shown in FIG. 12 may be assumed to be a portion of a comprehensive lookup function.

The process commences when a programmatic entity, such as conversion function 1132 in FIG. 11C, obtains an application-based name (step 1202). This initially-obtained application-based name may or may not be an aliased application-based name, but the initially-obtained application-based name may be assumed to be a compound name having multiple names for multiple contexts. The initially-obtained application-based name is processed to determine whether there are any aliases contained within it by parsing its form as a compound name into its constituent atomic names (step 1204). In other words, the initially-obtained application-based name is a string containing multiple substrings for multiple contexts, and these substrings are identified.

A determination is then made as to whether one of these constituent atomic names has been previously registered as an alias name (step 1206); in a preferred embodiment, only certain atomic names having particular positions within the compound name have the possibility of being an alias name. If so, then the compound name that was previously associated with the alias name is retrieved (step 1208). As was previously explained above, an alias name is defined as a compound name, and an alias name cannot contain another alias name. Hence, when an alias name is registered, it is associated with a compound name that must be a non-aliased application-based name. This associated non-aliased application-based name is substituted for the alias name within the initially-obtained application-based name (step 1210), thereby generating an expanded non-aliased application-based name that represents the same entity as the initially-obtained application-based name. The expanded non-aliased application-based name is then returned to the calling entity (step 1212), and the process is concluded.

If none of the atomic names within the initially-obtained application-based name were registered as an alias name, then the initially-obtained application-based name is a non-aliased application-based name, and the control logic branches from step 1206 to step 1212 to return the initially-obtained non-aliased application-based name to the calling entity, and the process is concluded.

As noted above, the J2EE specification defines several distinct roles in the application development and deployment life cycle. To support an implementation of the present invention, the duties that are performed by the role of administrator would need to be enhanced to support the registration of aliases, although such tasks would likely be assisted by management utilities. FIG. 13 illustrates the manner in which a system administrator may more easily manage applications through the use of aliased application-based names.

Figure 13A:
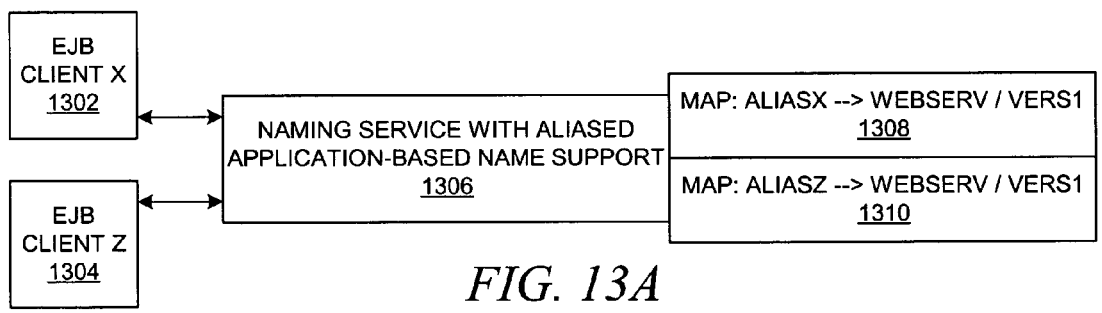
FIGS. 13A and 13B depict a pair of block diagrams that show a manner in which multiple versions of an application can be managed through the use of aliases within a data processing system that is implemented in accordance with an embodiment of the present invention.
Figure 13B:
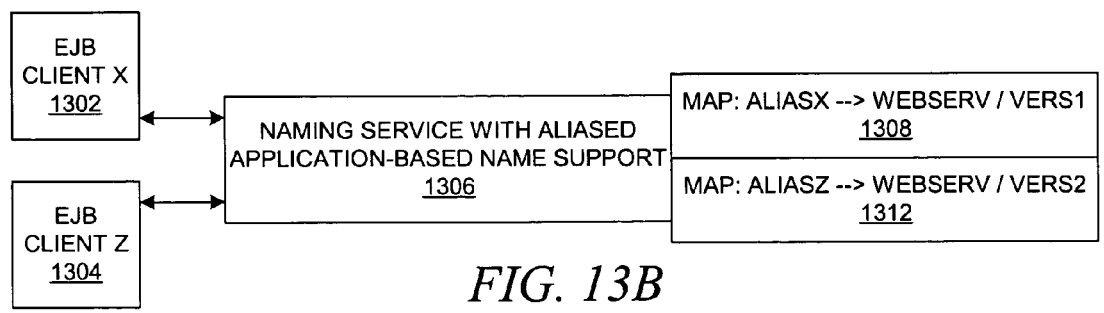

With reference now to FIGS. 13A and 13B, a pair of block diagrams illustrate a manner in which multiple versions of an application can be managed through the use of aliases within a data processing system that is implemented in accordance with an embodiment of the present invention. FIGS. 13A and 13B provide examples of the use of aliases in a manner similar to that described above with respect to FIG. 11C.

Referring to FIG. 13A, EJB clients 1302 and 1304 perform lookup operations through JNDI, which has been enhanced through the addition of functionality for a naming service with aliased application-based name support 1306. A datastore contains associations between alias names and non-aliased application-based names; FIG. 13A shows association 1308 that maps "aliasX" to "WebServ/vers1" and association 1310 that maps "aliasZ" to "WebServ/vers2". Resource/descriptor files that are associated with EJB client 1302 contains references to application-based names that contain the alias "aliasX", and resource/descriptor files that are associated with EJB client 1302 contains references to application-based names that contain the alias "aliasZ".

At some point in time, EJB client 1302 performs a lookup operation for a particular EJB that has a local reference name within the application, e.g., "myHello", which partially resolves to the aliased application-based name "cell/aliases/aliasX/modules/hello.jar/ejb/hello" during the lookup operation in accordance with information in the various types of resource and descriptor files. However, the temporary resolved name is an application-based name, and naming service support 1306 is invoked to process the application-based name, which discovers that the application-based name is an aliased application-based name. Naming service support 1306 processes this application-based name as described with respect to FIG. 12, and the alias name "aliasX" within the application-based name is expanded to include the non-aliased application-based name for "aliasX" that is provided in the datastore by association 1308, i.e., "WebServ/vers1". In accordance with other information in the datastore, the expanded non-aliased application-based name is then mapped to a topology-based name, e.g., the context under which all application-related files are stored, and the topology-based name is returned to EJB client 1302.

In a similar manner, at some point in time, EJB client 1304 performs a lookup operation for a particular EJB that has a local reference name within the application, e.g., "myHello", which partially resolves to the aliased application-based name "cell/aliases/aliasZ/modules/hello.jar/ejb/hello" during the lookup operation in accordance with information in the various types of resource and descriptor files. Naming service support 1306 processes this application-based name as described with respect to FIG. 12, and the alias name "aliasZ" within the application-based name is expanded to include the non-aliased application-based name for "aliasZ" that is provided in the datastore by association 1310, i.e., "WebServ/vers1". In accordance with other information in the datastore, the expanded non-aliased application-based name is then mapped to a topology-based name, e.g., the context under which all application-related files are stored, and the topology-based name is returned to EJB client 1304. Hence, in FIG. 13A, both EJB clients 1302 and 1304 will use the same version of the "WebServ" application.

Referring now to FIG. 13B, the datastore that is used by the application-based naming service support contains at least one different association between alias names and non-aliased application-based names as compared to FIG. 13A; FIG. 13B shows association 1312 that maps "aliasZ" to "WebServ/vers2" while association 1308 continues to map "aliasX" to "WebServ/vers1". Hence, in this example, EJB clients 1302 and 1304 use different versions of the "WebServ" application, even though the resource/descriptor files remain unchanged; only the datastore that supports the application-based naming service support needs to change. The example that is shown in FIG. 13B may represent the results of the installation of a new version of the "WebServ" application. As part of the installation procedure, a system administrator changes the information in the datastore of the application-based naming service to migrate some entities to use the newer version, which is done transparently with respect to the application's source files and resource/descriptor files.

Similar efficiencies can be achieved when installing multiple instances of the "WebServ" application. Assuming the deployment attributes refer to instances of an application rather than versions of an application as in the example that is shown in FIG. 13B, the alias names can be dynamically modified to migrate various client applications to different instances of the "WebServ" application. For example, both alias names "aliasX" and "aliasZ" can initially resolve to a first instance of the application, but after a second instance of the application is installed, the non-aliased application-based name that is associated with "aliasZ" can be modified in a datastore to map to the second instance of the application, which is also done transparently with respect to the application's source files and resource/descriptor files.

In comparison with installing versions of applications and multiple instances of applications, the movement of application files is simpler. For example, when an instance of an application is moved from one server to another, the topology-based names for the location of the application files also change. Using application-based names in accordance with an embodiment of the present invention, a minimal amount of reconfiguration is required; any references to the topology-based names for those application files within the application-based naming service's datastore are changed. Although a topology-based name in a file system that supports the storage of an application file does change when applications are moved from one server to another server, application-based names can remain unchanged, thereby allowing applications to be moved more efficiently amongst a set of servers, e.g., for load-balancing purposes or other purposes. The ability to move an application within a distributed data processing system without requiring updates to the application-based name(s) that are associated with the moved application can result in greatly enhanced efficiency.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for managing application files within a data processing system, the method comprising:
   registering an alias name, wherein the alias name represents a first compound name that includes an application name that is associated with an application and a deployment name that is associated with a deployment attribute that characterizes a deployment of an instance of the application, the registering an alias name further comprising
      associating the alias name with the first compound name that includes the application name and the deployment name; and
      storing the association of the alias name with the first compound name in a datastore;
   generating an application-based name associated with an application, wherein the application-based name represents a context within a naming system, and wherein the application-based name is a second compound name that includes the alias name; and
   managing an application within the data processing system using the application-based name.

2. The method of claim 1 wherein a deployment attribute is a metadata value that characterizes a manner in which the instance of the application is deployed within the distributed data processing system.

3. The method of claim 1 wherein the alias name represents the application name and multiple deployment names associated with multiple deployment attributes.

4. The method of claim 1 further comprising:
   associating the first compound name with a first topology-based name, wherein the first topology-based name represents a first context for organizing files that are related to the instance of the application.

5. The method of claim 1 further comprising:
   moving files that are related to the instance of the application; and
   associating the first compound name with a second topology-based name, wherein the second topology-based name represents a second context for organizing files that are related to the instance of the application.

6. The method of claim 1 further comprising:
   installing multiple versions of the application in the data processing system; and
   registering an alias name for each version of the application.

7. The method of claim 1 further comprising:
   installing multiple instances of the application in the data processing system; and
   registering an alias name for each instance of the application.

8. A computer program product in a computer readable medium for managing application files within a data processing system, the computer program product comprising:
   means for registering an alias name, wherein the alias name represents a first compound name that includes an application name that is associated with an application and a deployment name that is associated with a deployment attribute that characterizes a deployment of an instance of the application, the means for registering an alias name further comprising
      means for associating the alias name with the first compound name that includes the application name and the deployment name; and
      means for storing the association of the alias name with the first compound name in a datastore;
   means for generating an application-based name associated with an application, wherein the application-based name represents a context within a naming system, and wherein the application-based name is a second compound name that includes the alias name; and
   means for managing an application within the data processing system using the application-based name.

9. The computer program product of claim 8 wherein a deployment attribute is a metadata value that characterizes a manner in which the instance of the application is deployed within the distributed data processing system.

10. The computer program product of claim 8 wherein the alias name represents the application name and multiple deployment names associated with multiple deployment attributes.

11. The computer program product of claim 8 further comprising:
    means for associating the first compound name with a first topology-based name, wherein the first topology-based name represents a first context for organizing files that are related to the instance of the application.

12. The computer program product of claim 8 further comprising:
    means for moving files that are related to the instance of the application; and
    means for associating the first compound name with a second topology-based name, wherein the second topology-based name represents a second context for organizing files that are related to the instance of the application.

13. The computer program product of claim 8 further comprising:

means for installing multiple versions of the application in the data processing system; and means for registering an alias name for each version of the application.

14. The computer program product of claim 8 further comprising:

means for installing multiple instances of the application in the data processing system; and means for registering an alias name for each instance of the application.

15. An apparatus for managing application files within a data processing system, the apparatus comprising:

means for registering an alias name, wherein the alias name represents a first compound name that includes an application name that is associated with an application and a deployment name that is associated with a deployment attribute that characterizes a deployment of an instance of the application, the means for registering an alias name further comprising means for associating the alias name with the first compound name that includes the application name and the deployment name; and means for storing the association of the alias name with the first compound name in a datastore;

means for generating an application-based name associated with an application, wherein the application-based name represents a context within a naming system, and wherein the application-based name is a second compound name that includes the alias name; and means for managing an application within the data processing system using the application-based name.

16. The apparatus of claim 15 wherein a deployment attribute is a metadata value that characterizes a manner in which the instance of the application is deployed within the distributed data processing system.

17. The apparatus of claim 15 wherein the alias name represents the application name and multiple deployment names associated with multiple deployment attributes.

18. The apparatus of claim 15 further comprising:

means for associating the first compound name with a first topology-based name, wherein the first topology-based name represents a first context for organizing files that are related to the instance of the application.

19. The apparatus of claim 15 further comprising:

means for moving files that are related to the instance of the application; and means for associating the first compound name with a second topology-based name, wherein the second topology-based name represents a second context for organizing files that are related to the instance of the application.

20. The apparatus of claim 15 further comprising:

means for installing multiple versions of the application in the data processing system; and means for registering an alias name for each version of the application.

21. The apparatus of claim 15 further comprising:

means for installing multiple instances of the application in the data processing system; and means for registering an alias name for each instance of the application.

* * * * *